United States Patent [19]
Cummings

[11] 3,849,975
[45] Nov. 26, 1974

[54] CUTTING MEANS EMPLOYING ECCENTRIC ROTATIONAL CUTTING ACTION

[76] Inventor: Roy W. Cummings, P.O. Box 340, Lake Helen, Fla. 32744

[22] Filed: Oct. 29, 1973

[21] Appl. No.: 410,789

[52] U.S. Cl. .................... 56/295, 56/255, 56/246
[51] Int. Cl. ............................................. A01d 55/18
[58] Field of Search ............ 56/295, 255, 289, 11.3, 56/235, 13.6, 246, 277, 248

[56] References Cited
UNITED STATES PATENTS

| | | |
|---|---|---|
| 3,129,549 | 4/1964 | Stauffer .................... 56/295 |
| 3,135,081 | 6/1964 | Booth ...................... 56/255 |
| 3,472,007 | 10/1969 | Green ...................... 56/11.3 |
| 3,618,304 | 11/1971 | Hundhausen ............. 56/255 |

*Primary Examiner*—Russell R. Kinsey
*Attorney, Agent, or Firm*—Duckworth, Hobby & Allen

[57] ABSTRACT

Cutting apparatus including a member having a first curved cutting edge, with another member having a second cutting edge curved corresponding to the first cutting edge. The two members are supported by respective shafts, the curved cutting edge of the second member rotating both about its own shaft and eccentrically about the shaft of the first member, to effect cutting during 360° of rotation.

5 Claims, 3 Drawing Figures

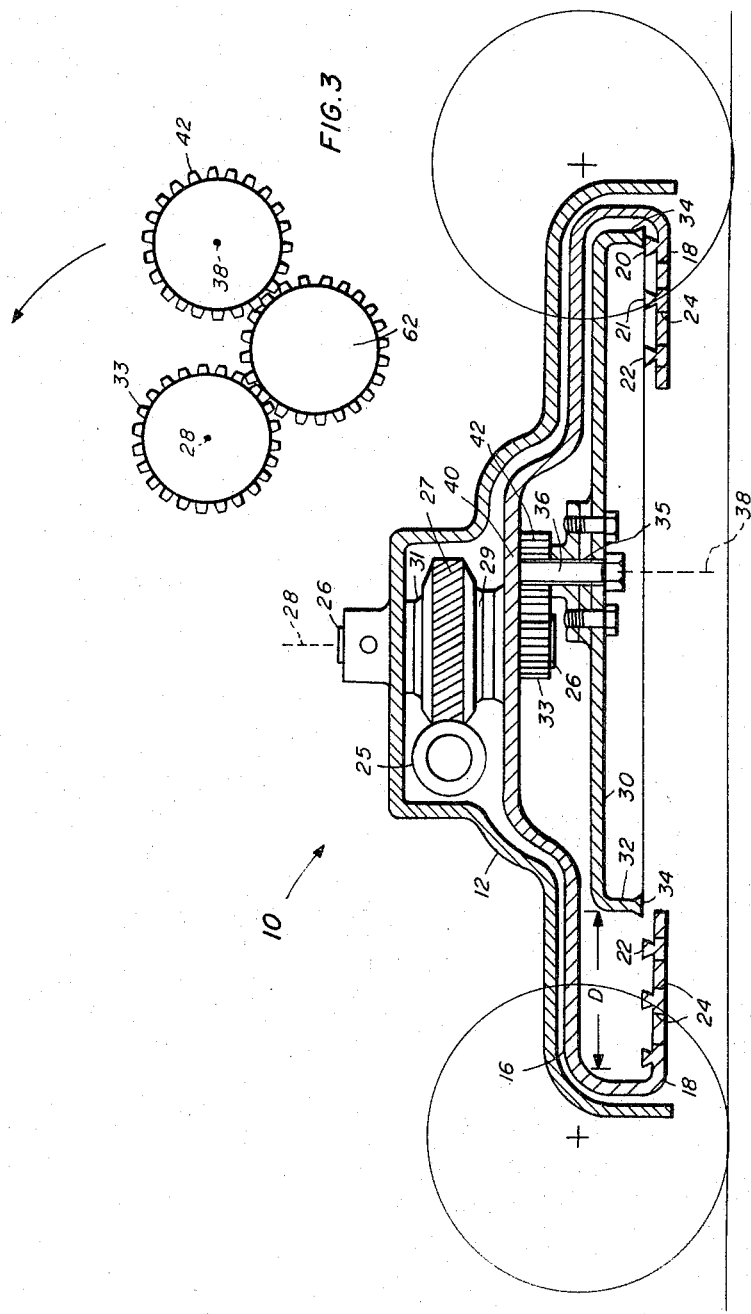

CUTTING MEANS EMPLOYING ECCENTRIC ROTATIONAL CUTTING ACTION

BACKGROUND OF THE INVENTION

1. Field of the Invention

The present invention relates to a variety of cutting apparatus, and in particular to cutting mechanisms employing eccentric rotational means to perform the cutting function.

2. Description of the Prior Art

A variety of cutting motions are employed consistent with the cutting implement and the material to be cut. For example, the basic design of scissors utilizes two straight cutting edges which are rotated together in a manner resulting in a direction of cutting attack which is other than normal to either blade.

Lawn mowers generally employ a rotating blade or a set of rotating blades. See for example U.S. Pat. No. 3,087,298 to Phillips and U.S. Pat. No. 2,721,438 to O'Maley.

Various compound motions are used with lathing tools, hand shears and other diverse cutting apparatus. However, prior art cutters of the annular type do not achieve cutting during the full 360° of rotation of the cutting surface. More specifically, such compound motions have linear or rotary transverse motions relative to the workpiece, and do not achieve cutting beyond 180° of rotation on their own axes.

SUMMARY OF THE INVENTION

The present invention contemplates a combination comprising a member having a first curved cutting edge, another member having a second cutting edge curved corresponding to the first cutting edge, and means for passing the second cutting surface with respect to the first cutting edge such that the direction of attack of the second cutting edge is other than normal to the first cutting edge at any intersecting point therebetween.

More specifically, both members are supported by respective shafts, and means are provided to rotate the another member about its own shaft and eccentrically about the shaft of the one member such that the direction of attack is in shear at an acute angle. When employed as a moving cutting tool, for example, as a lawn mower as further described in detail below, the combination further includes means for moving the cutting apparatus into the work piece for each cycle of rotation of the another member about the shaft of the one member a distance not greater than twice the maximum dimension between the cutting edges in order to effect cutting for more than 180° of rotation. The respective cutting edges may be rotated in the same, or in opposite directions.

THE DRAWING

FIG. 2 is a side view, partially in cross section, of the apparatus of FIG. 1.

FIG. 3 is a schematic top plan view of a portion of another embodiment of the lawn mower of FIG. 1.

DETAILED DESCRIPTION

Figure 1:
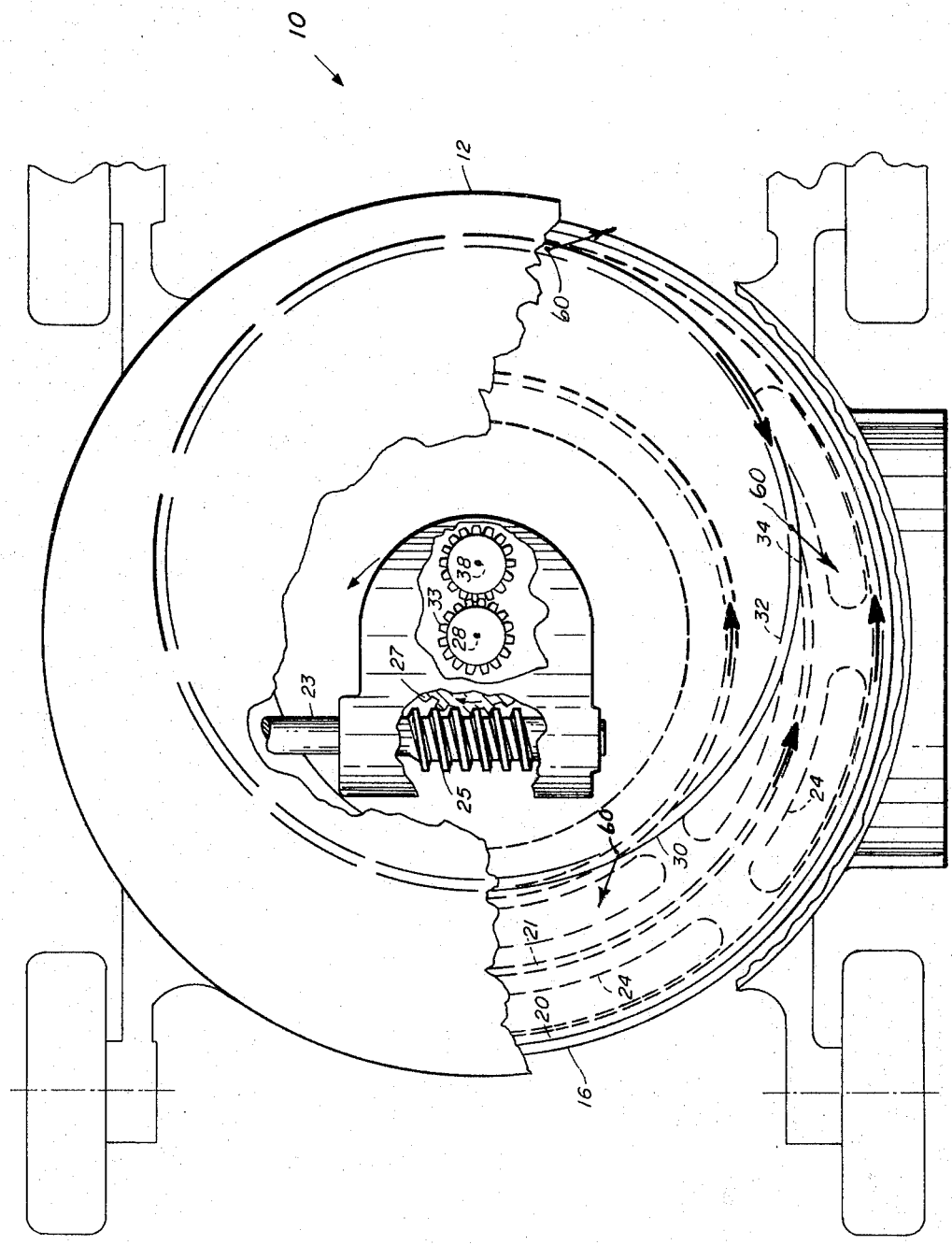
FIG. 1 is a top plan view of the cutting portion of a lawn mower employing the cutting action of the present invention.

A portion of a lawn mower embodying the cutting apaparatus of the present invention is shown in FIGS. 1 and 2 and described with reference thereto.

The mower, referred to generally as 10, includes an annular housing 12 having a central opening along the bottom thereof. The bottom is adapted to be supported over a surface, as by wheels. A bell shaped cutting member 16 is rotatably supported in the housing 12 by a first shaft 26 having an axis 28.

The cutting member 16 includes a cutting blade support 18 about the bottom thereof. The support 18 includes three annular, spaced cutting edges 20, 21 and 22 extending inwardly into the cutting member 16. A plurality of arcuate slots 24 are spaced about the support 18 between the raised cutting edges surface 20, 21 and 22 to allow grass and other lawn foliage to extend therethrough.

A drive shaft 23 extends into the housing 12 and includes a worm gear 25 on the end thereof. A correspnding worm wheel or gear 27 mounted on the first shaft 26 meshes with the worm gear 25. Bearing plates 29 and 31 insure that the first shaft 26 is rotatably fixed with the worm wheel or gear 27. A spar gear 33 is fixed on one extremity of the first shaft 26 inside the cutting member 16.

A flat disc 30 is positioned within the cutting member 16 and includes depending rim 32 therein. The disc 30 includes an annular cutting edge 34 about the periphery of the rim 32, and is supported by a second shaft 36 having an axis 38. A bearing sleeve 35 allows the disc 30 to rotate about the second shaft 36, and another gear 42 in mesh with gear 33 allows the disc 30 and its shaft 36 to rotate about the first shaft 26. In this manner, means are provided for mechanically coupling the two shafts, such that rotation of one causes rotation of the other. Additionally, an eccentric arm 40 is defined by that portion of the cutting member 16 between the two shafts 26, 36.

The relationship of the various gears is not critical. However, in accordance with one aspect of this invention, it is preferred that the gears 25, 27, 33 and 42 are related such that when the entire mower 10 is moved forward a distance D determined by the maximum radial dimension between the cutting edges 22, 34, the cylindrical member shaft 36 completes one revolution about the axis 28. This distance D is shown in FIGS. 1 and 2.

The mower 10 of the present invention employs an eccentric rotational cutting action which is hereinafter described in greater detail.

Noting FIG. 1, both the cutting member 16 and the cylindrical member 32 rotate about their respective axes 28, 38 due to the mechanical coupling of the gears 33, 42. This rotation about axis 38 of the disc 30 is in a direction opposite to the rotation of the cutting member 16 (note arrows parallel to the respective cutting members). Additionally, the shaft 36 of the disc 30 rotates about the shaft 26 of the cutting member 16 due to the defined eccentric arm 40. As noted previously, the gears 25, 27, 33 and 42 have a geared relationship such that when the mower 10 is linearly advanced into the work piece (i.e. the lawn foliage) a distance which is no greater than, and is preferably equal to twice the maximum radial dimension D between the outer extremities of the opposed cutting surfaces 22 and 34, then of the cylindrical member shaft 36 completes one revolution about the housing shaft 26. It is also preferred that the gearing relationship of the gears 25, 27, 33 and 42 causes one cycle of rotation of the disc 30 about its own axis 38 for each rotation of the shaft 36 of the cylindrical member 30 about the housing shaft 26. This, of course, is achieved by maintaining a 1:1 ratio between the gears 33, 42.

In this manner, at each point of intersection 60 between the disc cutting edge 34 with the housing cutting edges 20, 21 and 22, the direction of attack is in shear at an angle other than normal to any cutting edge (note arrows at intersecting points 60 in FIG. 1). In this way, a highly efficient cutting action takes place during the entire rotation of the respective cutting edges (360°) requiring a minimum of work to effect the cutting operation.

As noted with the embodiment described above, the cutting member 16 and the disc 30 effect a high shear-high work cutting action by eccentric rotation of the former, in a direction opposite to the rotation of the latter. However, for some types of cutting operations it is feasible to rotate both the cutting member 16 and the disc 30, in the same direction. Noting FIG. 3, this may be accomplished by interposing a third gear 62 rotatably mounted on the underside of the disc 30 in mesh with both the first shaft gear 33 and the second shaft gear 42.

While a lawn mower has been described above, it would be appreciated by those skilled in the art that the cutting action of the present invention may also be utilized with a wide variety of cutting tools, including but not limited to milling machines, lathes, shears, textile cutters and the like.

I claim:

1. Grass cutting means comprising:

a housing;

a cutting member rotatably mounted in said housing;

a cutting edge support having a raised cutting surface extending into said cutting member;

a cylindrical member positioned in said housing and having an opening therein;

a cutting edge about the periphery of said opening in said member; and means for rotating said cylindrical member in said cutting member such that the direction of attack of said cylindrical member cutting edge across said raised cutting surface is other than normal to said raised cutting edge at any intersecting point therebetween.

2. Apparatus as recited in claim 1 further comprising:

a first shaft having an axis, with said cutting member fixed to said first shaft;

a second shaft having an axis, with said cylindrical member fixed to said second shaft;

an eccentric arm defined between said first and second shafts;

driving means for rotating said first shaft;

means mechanically coupling said second shaft to said first shaft; and wherein rotation of said first shaft about its axis by said driving means causes rotation of said second shaft about its own axis and rotation of said second shaft about said axis of said first shaft.

3. Apparatus as recited in claim 2 wherein said cylindrical member rotates about said axis of said second shaft in a direction opposite to rotation of said cutting member, said cylindrical member further rotating eccentrically about said axis of said first shaft in the same direction as rotation of said cutting member.

4. Apparatus as recited in claim 1 further comprising:

another raised cutting edge about said support and spaced from said first raised cutting edge; and said housing further including a plurality of slots about said support between said two cutting edges.

5. Apparatus as recited in claim 1 further comprising means for moving said apparatus along a grass covered surface a distance not greater than the maximum dimension between said cutting surface of said cylindrical member and said raised cutting surface for each cycle of rotation of said cylindrical member.

* * * * *